United States Patent [19]

Deaton

[11] Patent Number: 4,555,965
[45] Date of Patent: Dec. 3, 1985

[54] SCISSORS CORRUGATING DEVICE

[75] Inventor: Mark E. Deaton, Ogden, Utah

[73] Assignee: Wright State University, Dayton, Ohio

[21] Appl. No.: 605,325

[22] Filed: Apr. 30, 1984

[51] Int. Cl.[4] .................... B23D 71/02; B21K 11/02
[52] U.S. Cl. .................................... 76/89.1; 76/82.2; 76/88; 269/234; 269/283
[58] Field of Search ............... 76/82.2, 82.1, 82, 88, 76/89.1; 269/234, 283; 51/285, 57, 59 R; 29/76 A, 76 R

[56] References Cited

U.S. PATENT DOCUMENTS

| | | | |
|---|---|---|---|
| 956,350 | 4/1910 | Hillstrom | 76/82 |
| 966,036 | 8/1910 | Mikesell | 76/82.2 |
| 1,681,763 | 8/1928 | Eaton | 76/82.2 |
| 1,704,334 | 3/1929 | Mitchell | 76/89.1 |
| 1,904,075 | 4/1933 | Petrich | 76/82.2 |
| 2,397,256 | 3/1946 | Foster | 76/82.2 |
| 2,471,699 | 5/1949 | Pavesi et al. | 76/89.1 |
| 2,557,093 | 6/1951 | Garbarino | 76/82.2 |
| 3,011,366 | 12/1961 | Sandven | 76/82 |
| 4,383,682 | 5/1983 | Feinberg | 269/283 |

Primary Examiner—Roscoe V. Parker
Attorney, Agent, or Firm—Biebel, French & Nauman

[57] ABSTRACT

A scissors corrugating device comprising an elongate corrugating file, an upper guide attached to the file at an upper end, a lower guide attached to the file at a lower end, a frame for supporting the guides, and a vise attached to the frame and including clamping jaws tooled to firmly hold a scissors' blade vertically and at various angles beneath the file. The lower guide moves linearly in slots formed in the frame in a path which is substantially parallel to the beveled edge of the clamped scissors' blade, and the upper guide moves within a second pair of slots formed in the frame along a path which is at an angle to the path of the lower guide. With each stroke of the file across the beveled edge of a clamped scissors' blade, the paths cause the guides and file to travel across the beveled edge and downwardly to score corrugations evenly, with repeatability along the beveled edge, and provide an improved mechanical advantage.

14 Claims, 8 Drawing Figures

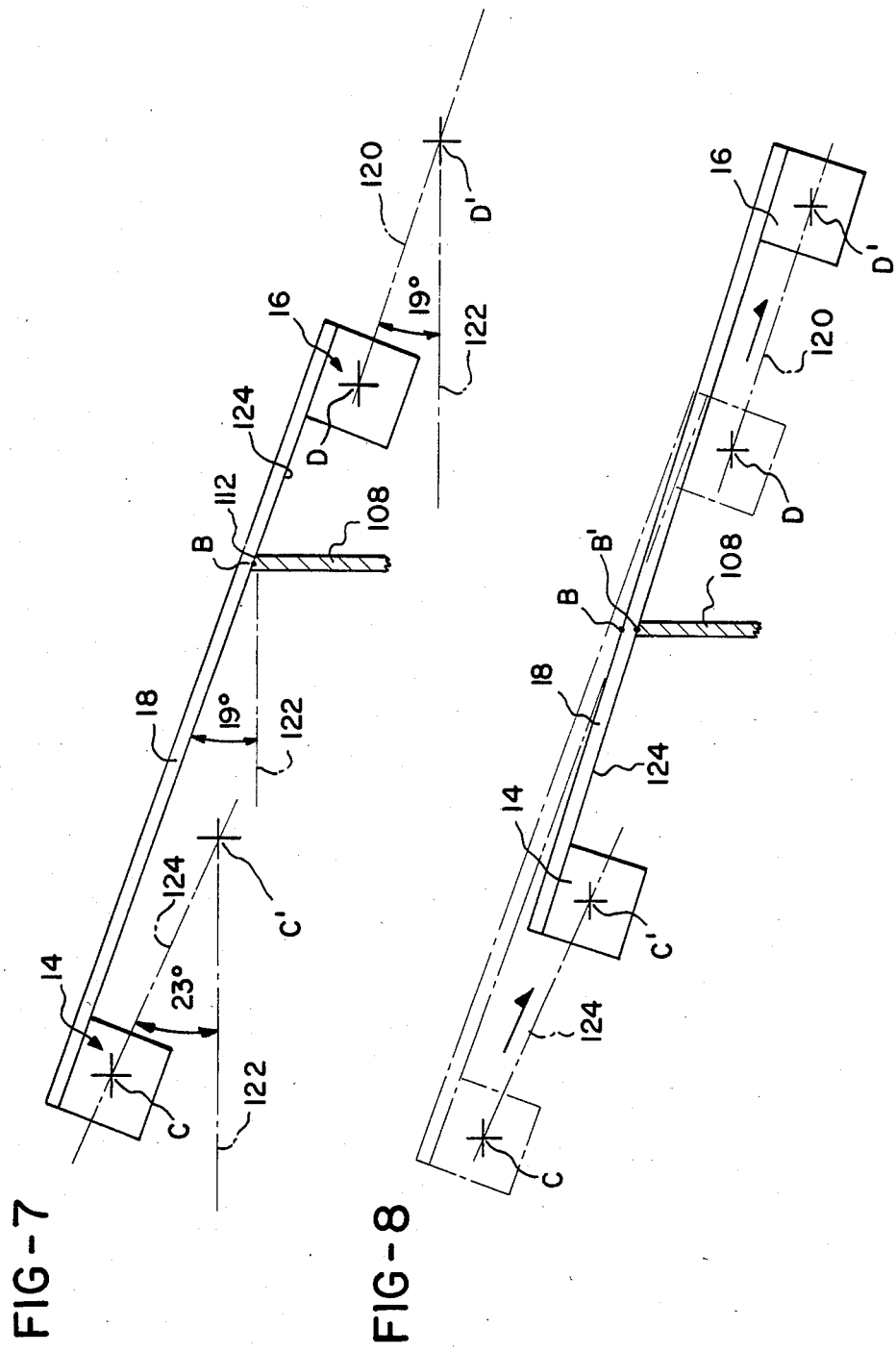

SCISSORS CORRUGATING DEVICE

BACKGROUND OF THE INVENTION

The present invention relates to devices for reconditioning the cutting edges of cutting implements and, more particularly, devices for scoring corrugations along the beveled cutting edges of scissors' blades.

In sharpening the blades of hair cutting scissors, it is necessary to rescore corrugations along the cutting edges. The corrugations hold the hair and prevent the hair strands from sliding along the scissors' blades as the blades close to shear the hair, thereby making possible greater precision in performing a hair cutting operation. Repeated sharpening of the beveled cutting edges of corrugated scissors' blades wears away the corrugations, making it necessary to recorrugate the blades after sharpening.

Typically, corrugations are scored into the cutting edges of scissors' blades with a corrugating file in a process done by hand, with the result that the precision of the formation of corrugations is highly dependent upon the skill of the craftsman performing the filing operation in holding the file at the proper angle to the beveled edge and exerting a consistently sufficient downward force into the blade to form corrugations of the appropriate depth. Furthermore, as a result of this human element, the pressure and resultant depth of the scoring, the spacing of scoring, and other parameters will vary along a beveled edge of a scissors' blade as well as from one craftsman to the next. Accordingly, there is a need to provide a device which scores corrugations along the beveled cutting edges of scissors' blades with repeatable precision and with a predetermined filing force which results in an even depth of scoring along the cutting edge.

Attempts have been made to develop a device for forming serrations on scissors' blades, and an example of such a device is shown in Mikesell U.S. Pat. No. 966,036. That patent shows a serrating device in which a serrating file is held horizontally by a pivotal attachment at one end to a support rod and a pivotal attachment to a link arm at an opposite end. The link arm is pivotally attached to the support rod at a location spaced from the pivotal connection with the file. A clamp is used to hold the scissors' blade such that the beveled edge of the blade is substantially horizontal and parallel to the flat working underside of the file.

The sharpening process is conducted by oscillating the file in an arc having as its center the pivotal connection between the file end and the rod. Although this device provides a measure of uniformity in scoring serrations on a scissors' blade, there is no control over the downward force exerted by the user operating the file upon the beveled edge of the blade. As a result, the depth of the serrations may vary along the length of a cutting edge as well as from user to user.

In performing a corrugating operation upon a scissors' blade, it is desirable to move the file relative to the beveled edge in a direction which is perpendicular to the beveled cutting edge. If the file is moved in a direction skewed to the cutting edge, the scoring is less effective. Since the movement of the corrugating file in the aforementioned Mikesell patent is pivotal rather than linear, the direction of the file movement during a corrugating operation can only approximate a linear stroke.

There are analogous structures found in the scissors sharpening art. Exemplary of such devices are the sharpeners disclosed in Petrich U.S. Pat. No. 1,904,075; Foster U.S. Pat. No. 2,397,256; Garbarino U.S. Pat No. 2,557,093; and Eaton U.S. Pat. No. 1,681,763. In each of these devices, a scissors' blade is held in a clamp, vise or the like, and a file is drawn across the beveled cutting edge at an angle parallel to the beveled edge. The file is supported at one end by the sharpening device and is grasped by the user at the opposite end, so that the user must attempt to apply a consistent and sufficient downward pressure to effect the requisite frictional engagement between the working face of the file and the cutting edge of the scissors' blade. Again, the pressure exerted by the file upon the instrument to be sharpened in each of these devices will vary along the length of the scissors' blade as well as from user to user.

Accordingly, there is a need for a corrugating device which is capable of scoring corrugations in the beveled cutting edge of a scissors' blade in an accurate and repeatable manner. Furthermore, it is desirable to provide such a device with means for regulating the downward pressure of the file against the cutting edge, so that it remains within predictable limits, regardless of the skill of the user.

SUMMARY OF THE INVENTION

The present invention is a scissors corrugating device in which a corrugating file is held by upper and lower guides such that the file is oriented parallel to the beveled edge of a scissors' blade clamped in position beneath it. The guides limit the movement of the file to a path in which the file is moved perpendicularly across the cutting edge as well as downwardly into the cutting edge a predetermined distance and depth. The device produces a mechanical advantage allowing adequate force throughout the stroke. These benefits are constant with each stroke, regardless of the skill or proficiency of the operator. The result is that the corrugating device of the present invention can score corrugations in the beveled edge of a scissors' blade with a high degree of accuracy and repeatability.

In a preferred embodiment of the invention, the corrugating device includes a frame having front and rear pairs of opposing side walls. Upper and lower pairs of guide tracks are formed in the side walls and receive the ends of upper and lower guide shafts, respectively, which extend between the side walls. Upper and lower clamps are slidably mounted on the upper and lower guide shafts, respectively, and are adapted to receive the ends of a corrugating file.

A vise is attached to the frame and includes a pair of clamping jaws which are adapted to hold the scissors' blade to be corrugated. The vise is adjustable so that the scissors' blade's orientation can be adjusted relative to the fixed motion of the corrugating file.

The lower guide slots are oriented to form a path which is substantially parallel to the beveled cutting edge of the clamped scissors' blade. The upper guide slots are oriented to form a path which makes an angle with the path of the lower guide slots and with the beveled cutting edge. Therefore, when the file is pushed across the clamped scissors' blade, the sliding engagement of the guide rods with the guide slots causes the file to move perpendicularly across and slightly down into the beveled cutting edge of the scissors' blade, thereby scoring corrugations of a predetermined depth. A mechanical advantage is realized as a result of a lever arm applied at the fulcrum of the scissors' blade's reaction with the file and the reaction on the upper and lower slot contact points. This process is repeated along the length of the scissors' blade by successively sliding the clamps across the guide rods slightly after each filing stroke or series of strokes, from one side of the frame to the other.

Also in the preferred embodiment, the jaws of the vise include a support pin and a support wedge, both slidable between the jaws of the vise, for supporting the side of the scissors' blade opposite the beveled cutting edge. This is desirable since the clamping force necessary to hold the blade in place during a corrugating operation is reduced when the scissors' blade is supported in this manner. The use of the wedge provides a measure of continuous adjustability to this support so that scissors' blades having a variety of configurations can be supported and so that the cutting edge can be aligned parallel to the plane of the file.

Accordingly, it is an object of the present invention to provide a scissors corrugating device in which an operator can move a corrugating file over the beveled cutting edge of a scissors' blade to score corrugations thereon in a manner which forms even and consistent corrugations which are perpendicular to the blade and which are of uniform depth along the length of the blade; a device in which such corrugations can be formed uniformly at an optimal depth regardless of the skill or coordination of the user; a corrugating device in which scissors' blades having a variety of shapes can be corrugated; and a device which scores corrugations on beveled cutting edges with a mechanical advantage on the part of the user.

Other objects and advantages will be apparent from the following description, the accompanying drawings and the appended claims.

BRIEF DESCRIPTION OF THE DRAWINGS

FIG. 3 is a front end elevation of the device shown in FIG. 2, in which the front side walls are broken away to show the guide slots, and the struts are broken to show the file and file support guides;

FIG. 4 is a detail showing the jaws of the blade vise shown in FIGS. 1–3 in which the support pin and support wedge are exploded away from their respective bores and notches;

FIG. 5 is a detail of the vise of FIGS. 1–3 showing the adjustable attachment to the frame;

FIG. 6 is a detail of the vise of FIGS. 1–3 showing a scissors' blade resting upon the support pin and wedge, both in section, adjacent a jaw;

FIG. 7 is a schematic view of the scissors' blade, corrugating file and support guides, showing the paths followed by the guides and the angular relationships between the guide paths and beveled cutting edge; and FIG. 8 is a schematic view as in FIG. 7, except that the corrugating file has been displaced along the paths of the support guides.

DETAILED DESCRIPTION OF THE PREFERRED EMBODIMENT

Figure 1:
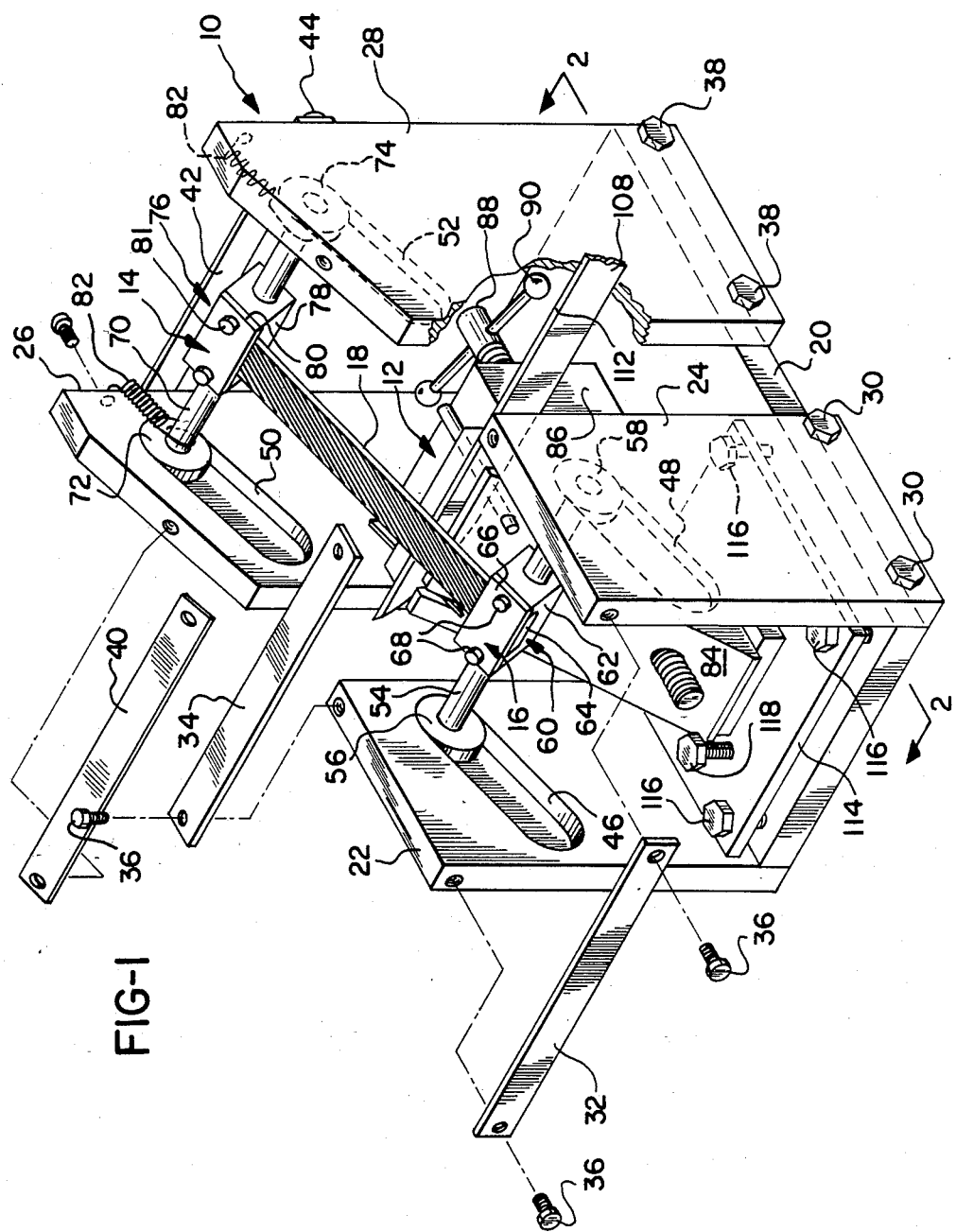
FIG. 1 is an exploded perspective view showing a preferred embodiment of the scissors corrugating device of the present invention, in which a rear side wall is partially broken away.
Figure 2:
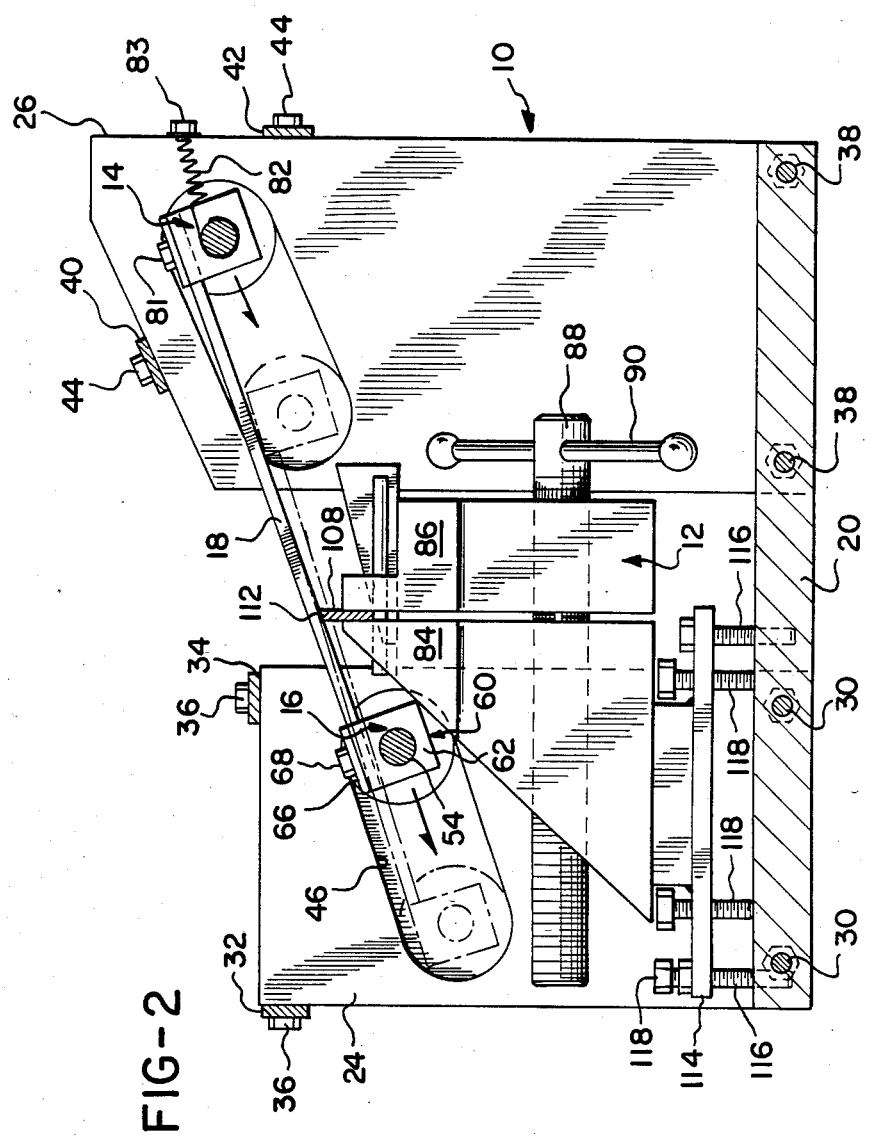
FIG. 2 is a side elevation in section of the device, taken at line 2—2 of FIG. 1, and showing the file and file support guides at the end of a corrugating stroke in phantom.

As best shown in FIGS. 1 and 2, the scissors corrugating device comprises a frame, generally designated 10, a vise 12 mounted on the frame, and upper and lower guides, generally designated 14, 16, respectively. A corrugating file 18 of a type well-known in the art extends between the upper and lower guides 14, 16, respectively. A preferred type of file 18 is a Nicholson brand 6" righthand corrugating file.

The frame 10 includes a base plate 20, a pair of opposing front side walls 22, 24, respectively, and a pair of opposing rear side walls 26, 28, respectively. The front side walls 22, 24 are attached at lower ends thereof to the sides of the base plate 20 by cap screws 30. The upper ends of the front side walls 22, 24 are secured to each other by transverse struts 32, 34, which are attached to the side walls by cap screws 36. Similarly, the rear side walls 26, 28 are attached to sides of the base plate 20 by cap screws 38 (shown in FIGS. 1 and 2 only for side wall 28), and are secured to each other at their upper ends by transverse struts 40, 42 attached by cap screws 44.

Figures 3, 4, 5, 6:
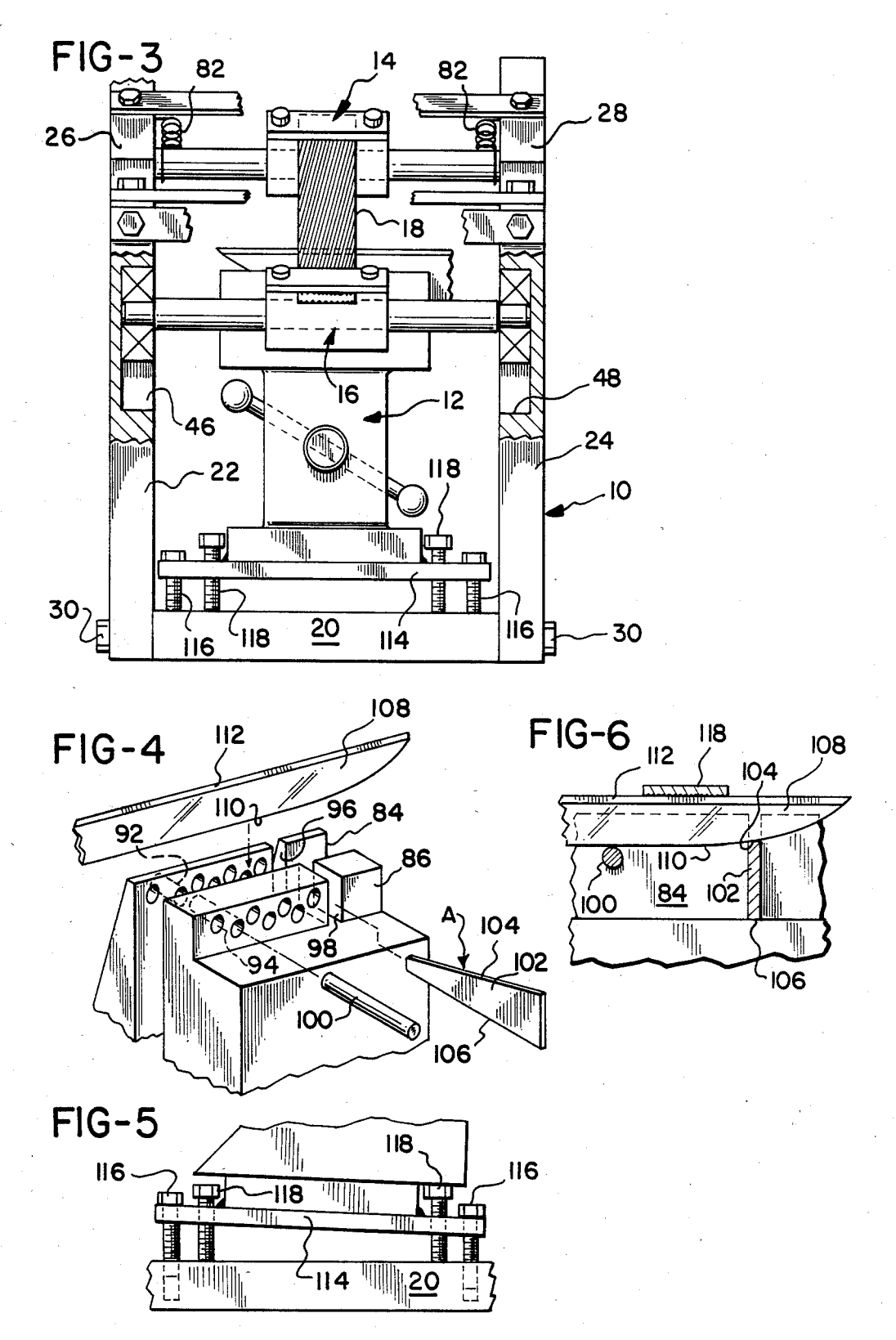

As shown in FIGS. 1, 2 and 3, front side walls 22, 24 include a pair of opposing lower slots 46, 48, respectively; and rear side walls 26, 28 include a pair of opposing upper slots 50, 52, respectively. The lower guide 16 includes a lower guide shaft 54 extending transversely of the base plate 20 and having roller bearings 56, 58 at its ends which are positioned within the lower slots 46, 48, respectively. A lower clamp 60 includes a block 62 which is slidably journaled on the lower guide shaft 54 and receives a lower end of the file 18 in a groove 64. A plate 66 is attached to the block by cap screws 68 to secure the file 18 within the groove 64.

Similarly, the upper guide 14 includes an upper guide shaft 70 extending transversely of the base plate 20 and having roller bearings 72, 74 at its ends positioned within the upper slots 50, 52, respectively. An upper clamp 76, similar to lower clamp 60, includes a block 78 slidably journaled on the upper guide shaft 70 and receives an upper end of the file 18 within a groove (not shown), and includes a plate 80, attached to the block by cap screws 81 to secure the file end within the groove. Two return springs 82 are secured to the rear side walls 26, 28 at their ends by screws 83, and their opposite ends are attached to the ends of shaft 70.

As shown in FIGS. 1, 2 and 4, the vise 12 resembles vises of well-known design and includes opposing jaws 84, 86 and a screw 88 which reciprocates jaw 86 relative to jaw 84. Screw 88 is threaded through the jaw 84 and includes a handle 90. Jaws 84, 86 include a pattern of pairs of opposing bores 92, 94 and, spaced from the bores, a pair of opposing notches 96, 98, respectively. A blade support pin 100 is positioned within the bores 92, 94. A support wedge 102 is positioned within notches 96, 98 and is shaped such that it may be slidably positioned relative to the jaws 84, 86. Support wedge 102 includes opposing longitudinal edges 104, 106 which are oriented to form an acute angle A with each other.

The support pin 100 and support wedge 102 are located relative to the jaws to vertically support and to prevent slippage of the scissors' blade 108 between the opposing jaws 84, 86 (see FIG. 6). The modification of the vise 12 to include the pin 100 and wedge 102 provides two distinct advantages over prior art corrugating devices having conventional vises. First, by vertically supporting the scissors' blade 108 on its side 110 opposite the beveled cutting edge 112, less clamping force is required to secure the scissors' blade in a fixed position during the corrugating operation, so that less stress and effort need be applied by an operator on the handle 90 and screw 88 (FIG. 2).

Second, the use of the support wedge 102 provides a measure of continuous adjustability so that any number of scissors' blades 108 having varying contours may be supported in vise jaws 84, 86 and be firmly held in a position so that side 112 of blade 108 is held parallel to the plane of the file. To make the adjustment, the scissors' blade is placed upon the support pin 100 and the support wedge is slid transversely of the jaws 84, 86 within the notches 96, 98 until it contacts the side 110 of the blade and rotates the side 112 of blade 108 to a position parallel to plane of file. An analytical study of this design suggests that a preferred angle A is approximately 15.5°. A wedge 102 having this shape provides an optimum combination of a relatively wide vertical range of support and a minimum of slippage based on the coefficient of friction between the notches 96, 98 of the vise 12 and the wedge.

In order to perform the corrugating operation at a 19° angle, it is necessary that a scissors' blade 108 clamped between jaws 84, 86 be oriented substantially perpendicularly to the base plate 20, which would be a substantially vertical orientation if the base plate rested upon a substantially horizontal supporting surface (not shown). However, to allow some variation in corrugation angles, the vise includes a measure of adjustability. Since the position and movement of the file is fixed, the vise incorporates adjustability through its base to change the angle of the scissors' blade and the vertical positioning of the scissors' relative to the file motion. In order to provide the greatest flexibility in the positioning of the scissors' side 112 relative to the file motion, the vise 12 includes an adjustable base 114 which is secured to the base plate 20 by cap screws 116 which are threaded into the base plate. Cap screws 116 are not threaded into the base 114 but rather are inserted through loosely toleranced holes (not shown) formed in the base.

Adjusting cap screws 118 are threaded through the base 114 and contact the upper surface of the base plate 20. By varying the depth of the cap screws 118 relative to the base 114, the elevation and vertical orientation of the jaws 84, 86 of the vise 12 can be adjusted. As shown in FIGS. 2 and 6, it is preferable that the vise 12 be positioned such that the beveled cutting edge 112 of the scissors+ blade 108 contacts the working underside face of the file 18 when the guides 14, 16 are in their uppermost positions within the slots 46, 48, 50, 52, respectively.

In order for the upper and lower guides 14, 16, respectively, (FIG. 1) to constrain movement of the file 18 to a path of movement which brings it perpendicularly across the beveled cutting edge 112 of the scissors+ blade 108 and downwardly into the blade, it is necessary that the angular orientation of the lower guide slots 46, 48 differ from that of the upper guide slots 50, 52. This relationship is best shown in FIGS. 7 and 8. The lower slots 46, 48 define a path indicated by line 120 which makes an angle of approximately 19° with the horizontal, represented by line 122. This angle is chosen because the beveled cutting edge 112 of most scissors' blades, represented by scissors' blade 108, typically is angled at approximately 19° from the horizontal when the blade is oriented substantially vertically as shown in the figures.

The upper guide 14 is constrained by the angular orientation of slots 50, 52 (FIG. 1) to move in a path represented by line 124 which forms an angle with the horizontal line 122 of approximately 23°, which is slightly steeper than the path defined by line 120. Therefore, as the file 18 is moved relative to the scissors' blade 108, the file is moved across the beveled cutting edge 112 and downwardly into the cutting edge to score the corrugations upon it.

At the start of the corrugating stroke, shown in FIG. 7, the guides 14, 16 and file 18 are in an upper position in which the underside 124 of the file is just touching the cutting edge 112 of the blade 108, the point of contact represented by point B. The relative positions of the upper and lower guides 14, 16, respectively, are represented by the points C, D, respectively.

At the end of the corrugating stroke, the upper and lower guides 14, 16, respectively, have moved along paths 124, 120, respectively, to locations designated in the figures as C', D', respectively. As a result of the different angular orientations of the paths 124, 120, the file 18 is urged downwardly into the beveled cutting edge 112 from point of contact B to point B' on the blade 108 (shown greatly exaggerated in FIG. 8). Therefore, for each stroke of the corrugating file 18, the working surface 124 is moved across the cutting edge 112 and downwardly into a predetermined distance and with a predetermined amount of pressure which is substantially constant for each stroke, regardless of the skill and proficiency of the user, and regardless of the contour of the scissors' blade. Springs 82 will return file to the uppermost position.

It should be noted, however, that in the preferred embodiment the path 120 followed by the lower guide 16 is to be parallel to the angular orientation of the beveled cutting edge 112 of the scissors' blade 108. Accordingly, it may be necessary at times to orient the vise 12 (FIG. 1) to hold the scissors' blade at an angle not substantially vertical in order to place the beveled cutting edge in such a parallel relationship with the path 120.

To operate the device 10, the scissors' blade 108 is first positioned between the jaws 84, 86 of the vise 12 and clamped into place so that it is substantially perpendicular to vise 12. The scissors' blade 108 should be positioned to rest upon the support pin 100 and support wedge 102 prior to clamping in the manner previously described. If necessary, the vise is then adjusted relative to the base plate 20 to position the beveled cutting edge 112 at an angle of 19° from the horizontal (again, assuming that the support plate 20 is resting upon a horizontal surface). Additionally, the beveled cutting edge 112 should be oriented parallel to the plane of the file and relative to the file such that it just touches the working underside 124 of the file when the upper and lower guides 14, 16, respectively, are in their uppermost position as shown in FIG. 1. The device 10 is now ready to perform a corrugating operation upon the scissors' blade 108.

To perform the operation, the operator simply urges the file in a generally downward direction by pushing the upper clamp 76 so that the bearings 72, 74, 56, 58 slide within their respective slots 50, 52, 46, 48. This movement guides the file 18 downwardly across the beveled cutting edge 112 of the blade 108 and downwardly into the blade, thereby scoring corrugations in the cutting edge. This process can be repeated along the length of the beveled cutting edge 112 by sliding the clamps 76, 60 from one end of the support shafts 70, 54 to the other. If the blade 108 is longer than the distance between the side walls 22, 24, 26, 28, as shown in FIG. 1, it is necessary for the jaws 84, 86 to be separated and the scissors' blade 108 to be repositioned relative thereto.

The corrugating device 10 preferably is made of a medium strength steel which possesses sufficient strength and wear characteristics to withstand the stresses involved. It may also be desirable to provide a corrosion-resistant coating on the components to inhibit the formation of rust or other deposits. A force analysis of the design of the preferred embodiment indicates a mechanical advantage such that an input force of two pounds produces a maximum downward reaction force of 119 pounds (529.3N). Also in the preferred embodiment, the motion downwardly into the cutting edge is preferably 0.0625 inches (0.1588 cm), with a stroke of approximately 2 inches (5.08 cm). The angle of the file will not be changed by more than 2° between the beginning and end of the stroke.

While the form of apparatus herein described constitutes a preferred embodiment of this invention, it is to be understood that the invention is not limited to this precise form of apparatus, and that changes may be made therein without departing from the scope of the invention.

What is claimed is:

1. A scissors corrugating device comprising:
   an elongate corrugating file;
   upper guide means attached to said file at an upper end thereof, for guiding said upper end along a first path at a first angle to the horizontal;
   lower guide means attached to said file at a lower end thereof, for guiding said lower end along a second path at a second angle to the horizontal, said second angle being less than said first angle; and
   means for adjustably holding a scissors' blade beneath said file at a predetermined position such that a beveled edge thereof faces said file so that movement of said upper and lower guide means along said first and second paths, respectively, causes said file to be drawn across and down into an associated beveled edge, thereby scoring even corrugations therein.

2. The device of claim 1 further comprising a frame supporting said upper and lower guide means and said blade holding means.

3. The device of claim 2 wherein said upper guide means includes upper slot means extending parallel to said first path; an upper guide shaft extending substantially transversely of said first path and including bearing means slidably engaging said upper slot means; and an upper clamp attached to said upper end of said file and slidably mounted on said upper shaft.

4. The device of claim 3 wherein said lower guide means includes lower slot means extending parallel to said second path; a lower guide shaft extending substantially transversely of said second path and including bearing means slidably engaging said lower slot means; and a lower clamp attached to said lower end of said file and slidably mounted on said lower shaft.

5. The device of claim 4 wherein said holding means includes vise means having a pair of opposing jaws; means for advancing and retracting said jaws relative to each other; and means for adjustably positioning and supporting a scissors' blade between said jaws, thereby reducing a clamping force of said jaws required to hold a blade fixed in position and allowing optimum positioning flexibility.

6. The device of claim 5 wherein said supporting means includes said jaws having a pattern of paired opposing bores and a pair of opposing notches spaced therefrom; a rod slidably positioned within said bores; and a wedge slidably positioned within said notches.

7. The device of claim 6 wherein said wedge includes opposing longitudinal edges making an angle of approximately 15.5° with each other.

8. The device of claim 5 wherein said vise means includes means for adjustably attaching said vise means to said frame such that a scissors' blade's orientation relative to file motion may be varied.

9. The device of claim 1 wherein said second path is substantially linear and parallel to a beveled surface of a held blade.

10. The device of claim 9 wherein said first path is substantially linear and oriented at an angle of approximately 4° with said first path.

11. A scissors corrugating device comprising:
    a frame having a base and front and rear pairs of sidewalls extending upwardly therefrom;
    upper guide means including a pair of opposing upper slots in said rear sidewalls, an upper guide shaft extending therebetween, bearing means positioned in said slots at ends of said upper shaft, and an upper clamp slidably mounted on said upper shaft;
    lower guide means including a pair of opposing lower slots in said front sidewalls, a lower guide shaft extending therebetween, bearing means positioned in said slots at ends of said lower shaft, and a lower clamp slidably mounted on said lower shaft;
    a corrugating file attached at an upper end thereof to said upper clamp, and at a lower end thereof to said lower clamp;
    vise means attached to said base and having a pair of opposing jaws, screw means for displacing said jaws relative to each other to clamp a scissors' blade therebetween, said jaws including pairs of opposing bores and a pair of opposing notches, a support rod slidably positioned in said bore and a support wedge slidably positioned in said notches, said rod and wedge adapted to support a scissors' blade between said jaws, and means for adjustably attaching said vise means to said base such that orientation of said jaws and scissors' blade can be varied relative to motion of said file; and
    said lower slots being linear in shape and oriented substantially parallel to a beveled edge of a blade clamped between said jaws, and said upper slots being linear in shape oriented at an angle to said lower slots of approximately 4°.

12. For use with a corrugating file, a scissors corrugating device comprising:
    upper guide means adapted to be attached to a corrugating file, for guiding an attached end of a file along a first path at a first angle to the horizontal;
    lower guide means adapted to be attached to an end of a corrugating file, for guiding an attached end of a file along a second path at a second angle to the horizontal, said second angle being less than said first angle; and
    means for holding a scissors' blade beneath an attached file at a predetermined position such that a beveled edge thereof faces an attached file so that movement of said upper and lower guide means along said first and second paths, respectively, causes an attached file to be drawn across and downwardly into an associated beveled edge, thereby scoring even corrugations therein.

13. A scissors corrugating device comprising:
an elongate corrugating file;
upper guide means attached to said file at an upper end thereof for guiding said upper end along a first path;
lower guide means attached to said file at a lower end thereof for guiding said lower end along a second path;
a vise for holding a scissors' blade beneath said file and including a pair of opposing jaws, means for reciprocating said jaws toward and away from each other, support pin means extending between said jaws and longitudinally slidable relative thereto, and support wedge means extending between said jaws and slidable relative thereto, thereby providing a vertically and continuously adjustable point of support for a scissors' blade.

14. The device of claim 13 wherein said wedge includes opposing longitudinal edges oriented at an angle of approximately 15.5° to each other.

* * * * *